United States Patent
Ramey (10) Patent No.: US 6,654,350 B1
(45) Date of Patent: Nov. 25, 2003

(54) METHOD AND APPARATUS FOR TRACKING A TRANSACTION ACROSS A MULTI-HOP NETWORK

(75) Inventor: Timothy Ramey, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/499,321

(22) Filed: Feb. 7, 2000

(51) Int. Cl.$^7$ ................................................ H04L 12/26
(52) U.S. Cl. ........................................ 370/252; 709/232
(58) Field of Search ................................ 370/252, 351, 370/389, 400, 410, 422, 902, 546, 401, 254; 709/224, 242, 228, 400, 220, 221, 223, 227, 230, 231, 232, 237, 238; 705/56, 58

(56) References Cited

U.S. PATENT DOCUMENTS 5,905,736 A    5/1999  Ronen et al. ............... 370/546
6,192,410 B1 * 2/2001  Miller et al. ................ 709/232

FOREIGN PATENT DOCUMENTS

EP    0971519 A1   1/2000
WO    WO99/23558   5/1999

OTHER PUBLICATIONS

Sartin R; "HP JetSend: Off-the Cuff Communication"; Byte, McGraw-Hill Inc. St. Peterborough, vol. 23, No. 4, Apr. 1, 1988 pp. 49–50.

* cited by examiner

Primary Examiner—Douglas Olms
Assistant Examiner—Robert W. Wilson (57) ABSTRACT

A system and method are provided for tracking a data transfer transaction across a multi-hop network. The system includes a number of devices that conduct a data transfer transaction across the multi-hop network. The data transfer transaction may occur in one or more transfer segments. The devices generally include an origination device and a destination device. The system also includes a service device in communication with the several devices. The service device generates a globally unique transaction identifier that is associated with each data transfer transaction undertaken via the multi-hop network. Since there is no field included in the data that is transferred that facilitates tracking of the data transfer transaction, a tracking table is maintained in the service device to track the data transfer transaction from the origination device to the destination device. The tracking table is associated with the globally unique transaction identifier and includes information from the various devices involved in the data transfer transaction across the multi-hop network.

9 Claims, 6 Drawing Sheets

METHOD AND APPARATUS FOR TRACKING A TRANSACTION ACROSS A MULTI-HOP NETWORK

TECHNICAL FIELD

The present invention is generally related to the field of data communications and, more particularly, is related to a system and method for tracking a transaction across a multi-hop network.

BACKGROUND OF THE INVENTION

With the dawn of the information age, data transmission is accomplished via many existing data communications networks. These networks are created using various network technologies that constantly evolve as technical innovation occurs. Currently, data superhighways such as the Internet extend around the world. Individuals can access these networks by purchasing access from one of many existing service providers.

Other service providers may provide specialized services in addition to access to networks. For example, special data transfers may be facilitated, where such service providers bill clients based upon the nature of the data transfer and whether it was successful. In performing these data transfers, the service provider may employ a data communications protocol that does not facilitate tracking of a particular data transmission through the data communications network. Particularly, in the case where data is transmitted in packets, for example, it may also be desirable not to add any further overhead to the data packet for purposes of tracking data transmissions. Consequently, such communications protocols are not useful in situations where tracking of a transmission of a data packet that hops among various nodes of a data communications network is necessary.

SUMMARY OF THE INVENTION

In light of the foregoing, a system and method are provided for tracking a data transfer transaction across a multi-hop network. According to one embodiment of the present invention, the system includes a number of devices that conduct a data transfer transaction across the multi-hop network. The data transfer transaction may occur in one or more transfer segments. The number of devices generally include an origination device and a destination device. The system also includes a service device in communication with the number of devices.

The service device generates a globally unique transaction identifier that is associated with each data transfer transaction undertaken via the multi-hop network. Since there is no field included in the transferred data that facilitates tracking of the data transfer transaction, a tracking table is maintained in the service device to track the data transfer transaction from the origination device to the destination device. The tracking table is associated with the globally unique transaction identifier and includes information from the various devices involved in the data transfer transaction across the multi-hop network.

The present invention may also be viewed as a method for tracking a data transfer transaction across a multi-hop network. In this regard, the method comprises the steps of: conducting a data transfer transaction among a number of devices in the multi-hop network, the data transfer segment having at least one transfer segment across the multi-hop network, the devices including an origination device and a destination device; generating a globally unique transaction identifier associated with the data transfer transaction in a service device, the service device being in communication with the devices; and, maintaining a tracking table in the service device to track the data transfer transaction from the origination device to the destination device, the tracking table being associated with the globally unique transaction identifier.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 2D1–2 are flow charts of a receive subroutine of the report logic of FIG. 2A.

DETAILED DESCRIPTION OF THE INVENTION

Figure 1:
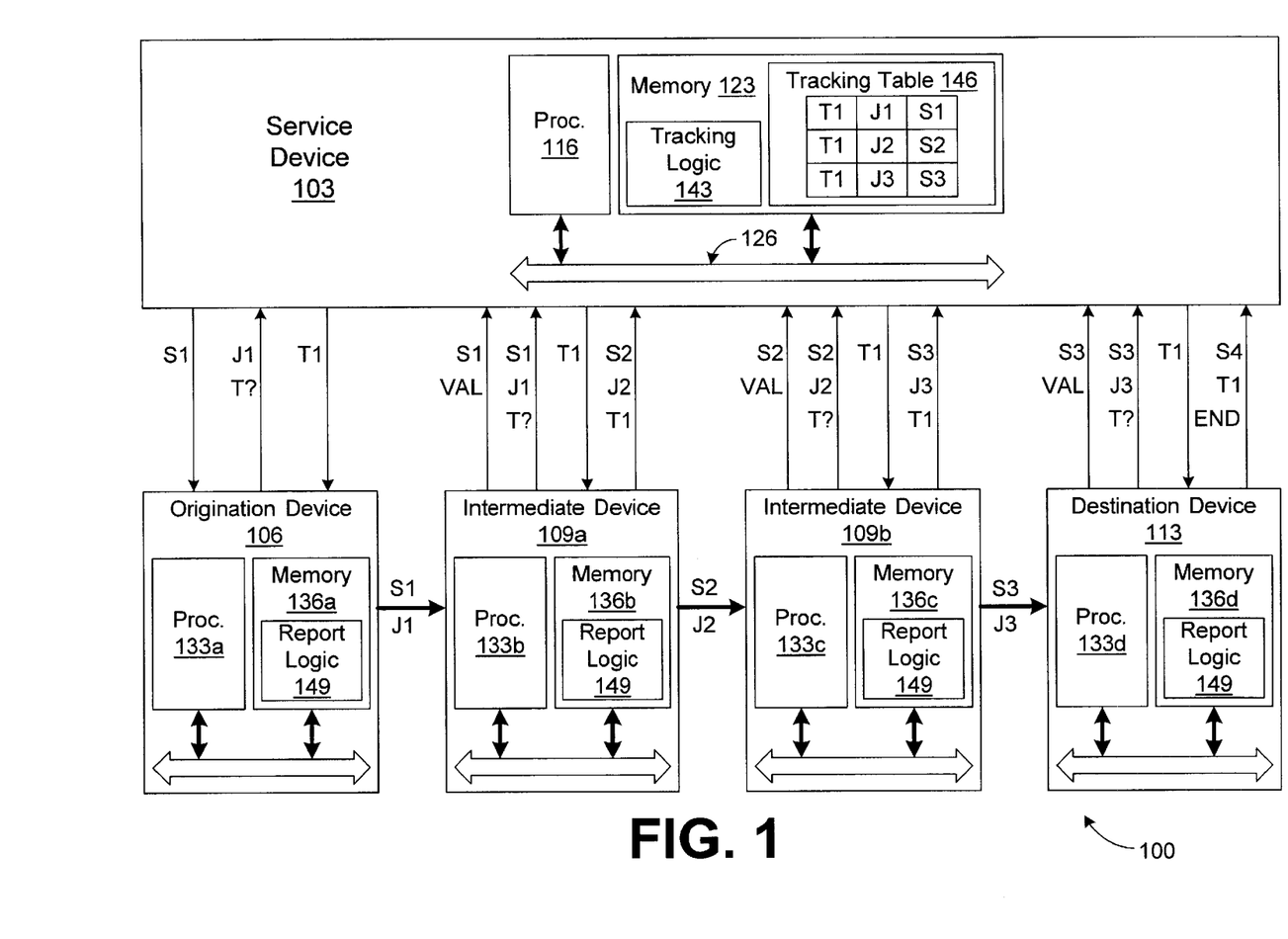
FIG. 1 is a block diagram of a multi-hop network according to an embodiment of the present invention.

Turning to FIG. 1, shown is a multi-hop network 100 according to an embodiment of the present invention. The multi-hop network 100 includes a service device 103, an origination device 106, a first intermediate device 109a, a second intermediate device 109b, and a destination device 113. The devices 106, 109a, 109b, and 113 generally comprise nodes in the multi-hop network 100, although there may be many more such devices in the multi-hop network 100. The devices 106, 109a, 109b, and 113 shown are to provide a context for an explanation of the various embodiments of the present invention.

The service device 103 includes a processor 116 and a memory 123 electrically coupled to a local interface 126. The local interface 126 may comprise, for example, a data bus and a control bus. The service device 103 may comprise, for example, a switch, computer system, server, or other similar system.

The origination, intermediate, and destination devices 106, 109a, 109b, and 113 include processors 133a–d and memories 136a–d that are electrically coupled to respective local interfaces 139a–d as shown. Each of the devices 106, 109a, 109b, and 113 are in electrical communication with each other as nodes in the multi-hop network 100. Each of the devices 106, 109a, 109b, and 113 is also in electrical communication with the service device 103 as shown.

The service device 103 also includes tracking logic 143 that is stored on the memory 123 and executed by the processor 116. Also stored on the memory 123 is a tracking table 146 that is maintained by the service device 103 as it executes the tracking logic 143 to track the progress of a data transfer transaction through the multi-hop network 100. The devices 106, 109a, 109b, and 113 all include report logic 149 that is stored on the memories 136a–d and executed by the processors 133a–d. The report logic 149 allows the devices 106, 109a, 109b, and 113 to send and receive information to and from the service device 103 to facilitate the tracking functionality of the service device 103 as will be discussed. The origination, intermediate, and destination devices 106, 109a, 109b, and 113 may actually be physically interchangeable as nodes in the multi-hop network 100. The particular designations of "origination", "intermediate", and "destination" are merely used to provide a context to facilitate the discussion of the operation of the multi-hop network 100 as described herein.

The multi-hop network 100 is employed to facilitate data transfer transactions among the data among devices 106, 109a, 109b, and 113 in the multi-hop network 100 in one or more segments transfers. Note that the segment transfers are accomplished according to a packet switching protocol that employs destination information in a header of the data payload to route the data payload through the multi-hop network 100. This is done while at the same time monitoring the progress of the data transfer transactions for purposes of billing for the data transfer and other objectives. The service device 103 is generally under the control of a service provider that manages the multi-hop network 100, etc.

The billing functions and other functionality are accomplished without introducing any new overhead into the headers or data payload of the data packets or messages that are transferred through the devices in the multi-hop network 100. For example, the data communication protocol employed by the devices 106, 109a, 109b, and 113 may be a protocol such as JetSend™ originated by Hewlett Packard Company, a corporation of the state of Delaware and having its principal place of business in Palo Alto, Calif. Other like protocols may be employed as well.

Next, the general operation of the multi-hop network 100 is described. To begin, the origination device 106 generates data or data generated by a device coupled to the origination device 106 is provided thereto. At startup, the origination device 106, as well as the intermediate and destination devices 109a, 109b, and 113 establish data communications with the service device 103 and receive a session identifier S1–S4, respectively from the service device 103. The session identifiers S1–S4 may be, for example, an internet protocol address or other like designation, etc.

The origination device 106 begins a first segment transfer of the data transfer transaction by generating a job identifier JX and then transmitting the job identifier J1 to the service device 103 with a request for a globally unique transaction identifier key TX with which to track the data transfer transaction. The service device 103 responds by generating a globally unique transaction identifier TX and transmitting it to the origination device 106. The origination device 106 also transmits its session identifier S1 to the first intermediate device 109a. The first intermediate device 109a transmits the session identifier S1 that was received from the origination device 106 to the service device 103 along with a validation request VAL. The service device 103 validates the session identifier S1 for the first intermediate device 109a. The origination device 106 then commences data transfer of the data payload to the intermediate device 109a along with the job identifier J1 that was generated by the origination device 106. The job identifiers JX are generally associated with each segment transfer of the data transfer transaction as will be illustrated.

Upon generating the transaction identifier T1, the service device 103 also generates a tracking table 146 that is associated with the transaction identifier T1. The tracking table 146 will then be employed to track the progress of the data transfer transaction throughout the multi-hop network 100. The service device 103 places the job identifier J1 and the session identifier S1 in the tracking table 146 as the beginning point from which the data payload was transferred, i.e., the origination device 106.

Upon receiving the session identifier S1 and the job identifier J1 from the origination device 106, the intermediate device 109a transmits the same to the service device 103 along with a request (T?) for the associated transaction identifier T1. When the session identifier S1 and the job identifier J1 are received with the request, the service device 103 finds the tracking table in which the same session identifier S1 and the job identifier J1 are stored. An association is drawn between the transaction identifier T1 for the particular table and the received session identifier S1 and the job identifier J1. The service device 103 then transmits the transaction identifier T1 to the intermediate device 109a as shown.

Thereafter, the intermediate device 109a examines the data payload received from the origination device and realizes that it is not the ultimate destination. The intermediate device 109a then transmits its session identifier S2 to the second intermediate device 109b. The second intermediate device 109b then transmits the session identifier from the intermediate device 109a along with a validation request VAL to the service device 103. The service device 103 validates the session identifier S2 and thereafter informs the second intermediate device 109b of the same.

The first intermediate device 109a then generates a job identifier J2 and transmits the same along with the data payload to the second intermediate device 109b. The first intermediate device 109a then transmits its session identifier S2 as well as the job identifier J2 and the transaction identifier T1 to the service device 103 with instructions that the service device 103 update the tracking table with this information. The service device 103 places the session identifier S2 and the job identifier J2 into the tracking table as shown. In this manner, the service device 103 tracks the devices 106 and 109a that are employed in the data transfer transaction and the corresponding.

Upon receiving the session identifier S2 and the job identifier J2, the second intermediate device 109b transmits the same to the service device 103 along with a request (T?) for the associated transaction identifier associated therewith. The service device 103 then looks up the session identifier S2 and the job identifier J2 in the tracking table 146 and identifies the associated transaction identifier T1. The service device 103 then transmits the transaction identifier T1 to the second intermediate device 109b in accordance with its request. Note that the session identifier S2 and the job identifier J2 generally appear in a single tracking table 146 where the service device 103 includes several such tables. Thus, the service device 103 searches all tables 146 for the pair.

The second intermediate device 109b examines the data payload received from the first intermediate device 109a and, upon realization that it is not the destination device for that data, establishes data communications with the destination device 113. In particular, the session identifier S3 of the second intermediate device 109b is transmitted to the destination device 113 for validation in similar fashion to the previous devices. The second intermediate device 109b then generates a job identifier J3 in order to transmit the data payload to the destination device 113. As was the case with the first intermediate device 109a, the second intermediate device 109b transmits the session identifier S3 and the job identifier J3 to the service device 103 along with the transaction identifier T1 so that the service device 103 may include the same in the tracking table 146.

Thereafter, the second intermediate device 109b transmits the job identifier J3 along with the data payload to the destination device 113. Upon receiving the job identifier J3 from the second intermediate device 109b, the destination device 113 transmits the session identifier S3 and the job identifier J3 to the service device 103 with a request (T?) for the associated transaction identifier. Once again, the service device 103 transmits the transaction identifier T1 to the destination device 113 in response to the request.

The destination device 113 then examines the data payload it received from the second intermediate device 109b and realizes that it is the ultimate destination of the data. The destination device 113 then transmits its session identifier S4, the transaction identifier T1, and an end signal END to the service device 103. The end signal END from the destination device 113 informs the service device 103 that the destination device 113 is, in fact, the ultimate destination of the data message sent from the origination device 106, and that no further data segment transfers are to be undertaken.

Upon receiving the end signal END from the destination device 113, the service device 103 examines the tracking table 146 to identify the various segment transfers that have occurred from device to device in the course of the data transfer transaction and can generate billing information and other information therefrom.

Figure 2A:
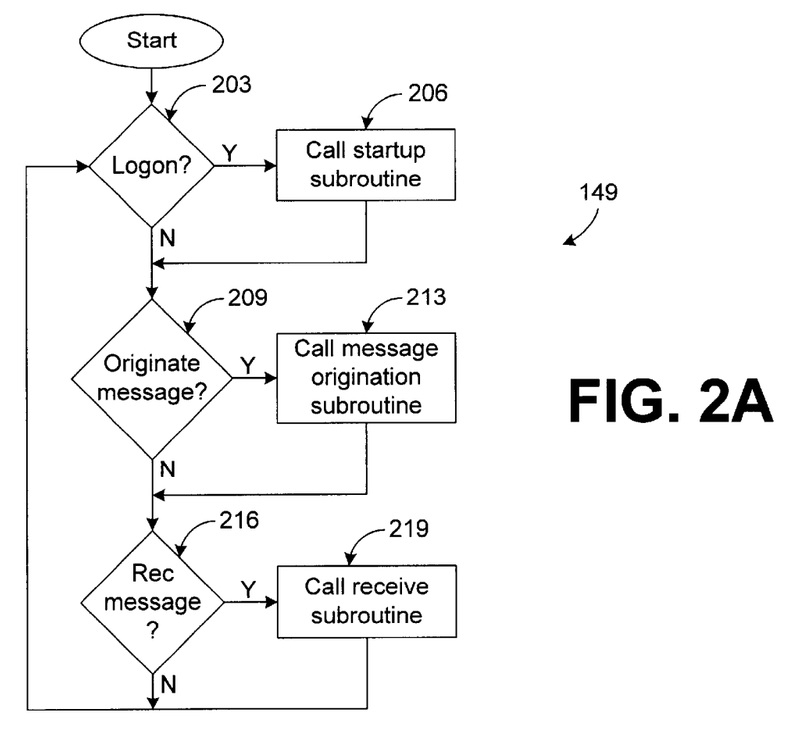
FIG. 2A is a flow chart of report logic executed in a non-service device of the multi-hop network of FIG. 1.

With reference then to FIG. 2A, shown is a flow chart of the report logic 149 executed by the processors 133a–d of the devices 106, 109a, 109b, and 113. Beginning with block 203, the report logic 149 determines whether a device has logged on with the service device 103. If such is the case, then the logic 149 proceeds to block 206 in which a start up subroutine is executed. If no logon occurs in block 203, then the logic 149 proceeds to block 209.

In block 209, the logic 149 determines whether a data payload has been originated that must be transmitted to a particular destination device 113. If such is the case, then the logic 149 moves to block 213 in which a message origination subroutine is executed. If there is no message origination in block 209, then the logic 149 proceeds to block 216. In block 216, the logic 149 determines whether a segment transfer is to be received from another device in the multi-hop network 100. If there is such a segment transfer to be received, the logic will then move to block 219 in which a receive subroutine is executed. Otherwise, the logic 149 will revert back to block 203. Therefore, according to the flow chart of FIG. 2A, the logic 149 performs a task when necessary based upon the state of the particular device as well as the interaction with other devices.

Figure 2B:
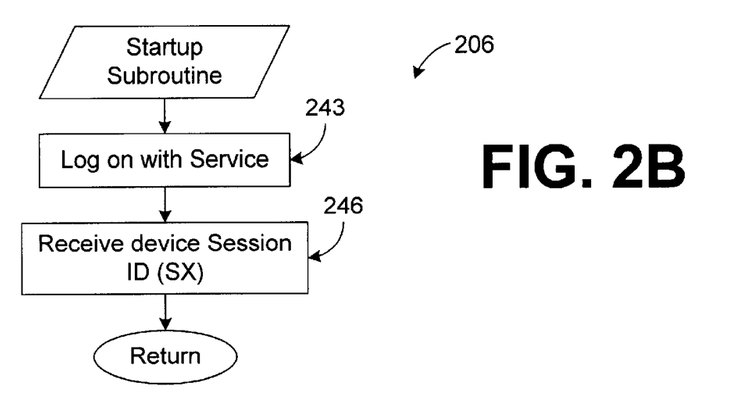
FIG. 2B is a flow chart of a startup subroutine of the report logic of FIG. 2A.

With reference then to FIG. 2B, shown is the start up subroutine 206 that was executed by the logic 149 as discussed with reference to FIG. 2A. Beginning with block 243, the subroutine 206 causes the device to log on with the service device 103 using appropriate hand shaking and other communications based on a predetermined protocol. Thereafter, in block 246, the device receives its session identification SX from the service device 103. Thereafter the subroutine 206 ends and the logic 149 returns to the flow chart of FIG. 2A.

Figure 2C:
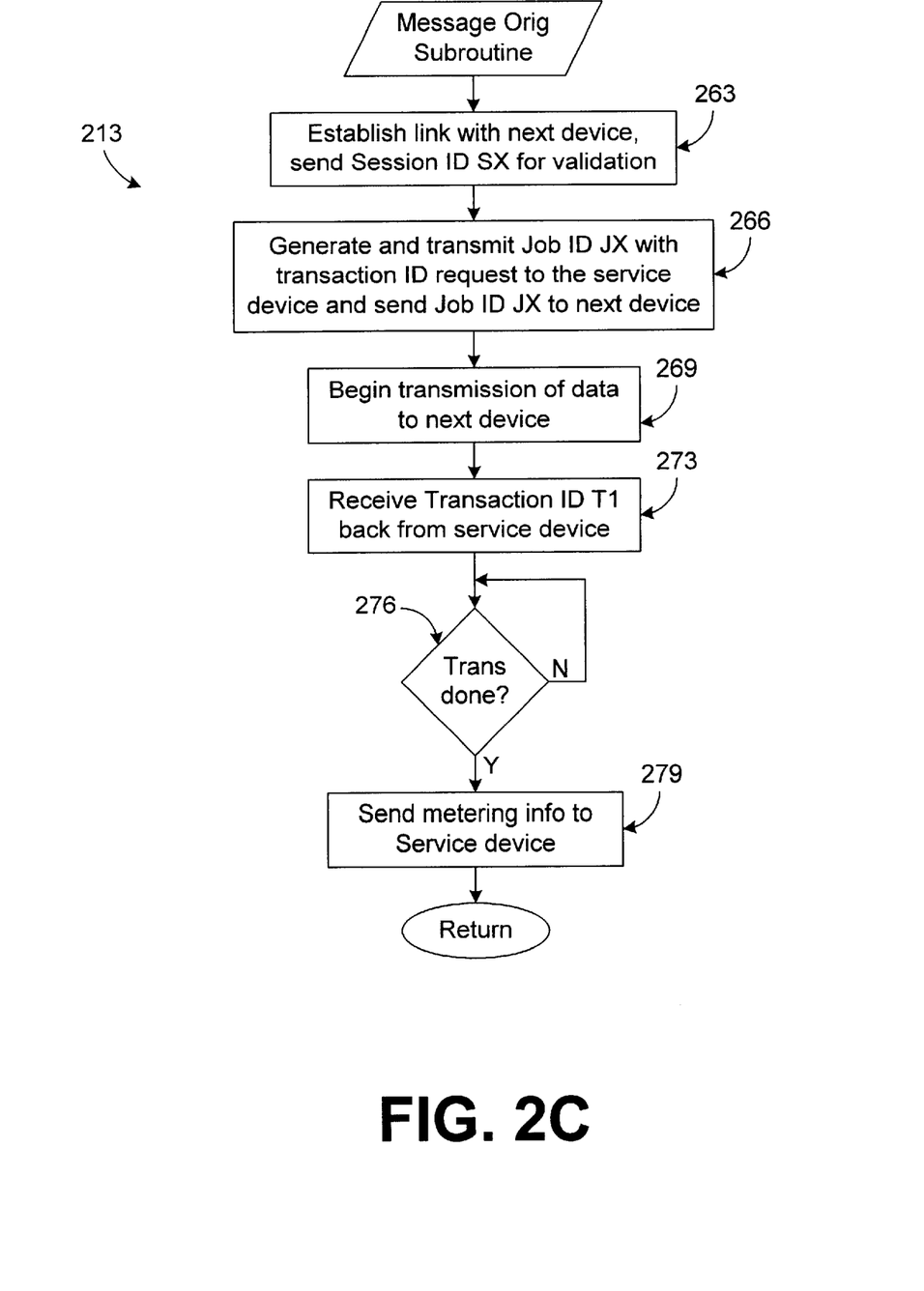
FIG. 2C is a flow chart of a message origination subroutine of the report logic of FIG. 2A.

With reference to FIG. 2C, shown is the message origination subroutine 213. The subroutine 213 begins with block 263 in which a communications link is established with the next device and thereafter, the session identifier of the current device is transmitted to the next device for validation. Note that the next device could be either an intermediate device 109 or a destination device 113. The subroutine 213 then progresses to block 266 in which a job identifier is generated and transmitted with the transaction identifier along with a request for the transaction identifier to the service device 103. Also, the job identifier is transmitted to the next device. The subroutine 213 then moves to block 269 in which the transmission of the data payload to the next device is commenced. Then, in block 273, the current device receives a transaction identifier TX back from the service device 103 in response to the previous request. Next, in block 276, the current device detects whether or not the transmission of the data to the next device is complete. If not, then the subroutine 213 remains at block 276. Once the transmission is complete in block 276, the subroutine 213 proceeds to block 279 in which metering information relative to the data transmitted is sent to the service device 103. Thereafter, the message origination subroutine 213 ends and the logic 149 reverts back to block 216 of the flow chart of FIG. 2A.

Figure 2D:
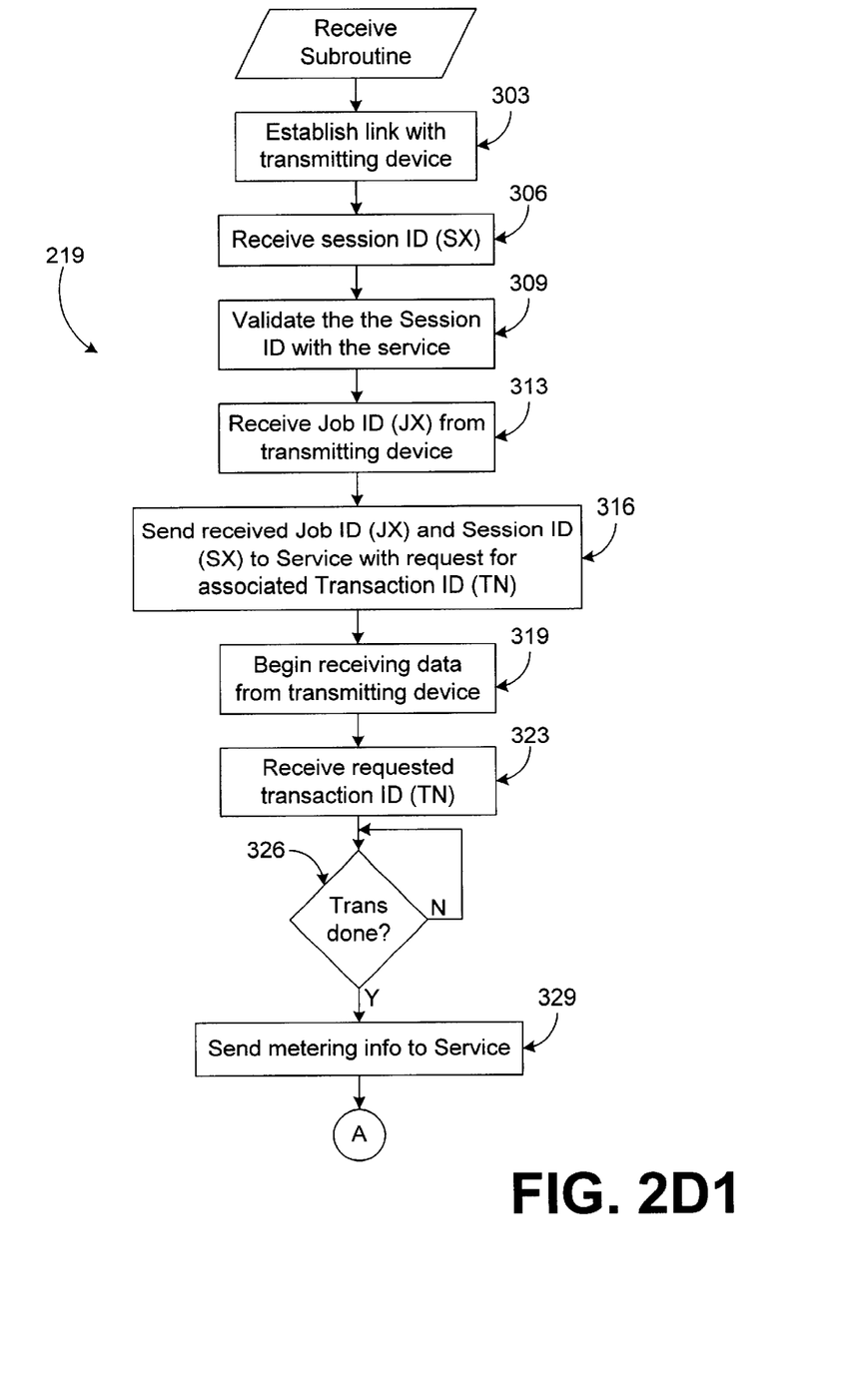

Turning now to FIG. 2D1, shown is the receive subroutine 219 that is executed in block 219 (FIG. 2A). The receive subroutine 219 is executed when a particular device 106, 109a, 109b, or 113 is to receive a data payload from a prior device. Beginning with block 303, the subroutine 219 establishes a communications link with the transmitting device. Thereafter, in block 306 the session identifier SX of the transmitting device is received. Next, the current device validates the session identifier SX with the service device 103 in block 309. Then, a job identifier JX is received from the transmitting device in block 313.

Thereafter, in block 316, the current device sends the job identifier JX and the session identifier SX received from the transmitting device to the service device 103 with a request for the transaction identifier associated with the job identifier JX and the session identifier SX. Then, in block 319, the current device begins receiving the data payload from the transmitting device. Thereafter, in block 323 the transaction identifier requested from the service device 103 is received.

Then, in block 326, the current device determines whether the transmission of the data from the transmitting device is complete. If not, then the subroutine 219 remains at block 326. Once the transmission is complete in block 326, the subroutine 219 progresses to block 329 in which metering information is sent to the service device 103 relating to the transmission of the data that has just been completed. Thereafter, the subroutine 219 goes on to connector A.

With reference to FIG. 2D2, shown is the second portion of the subroutine 219. From connector A the subroutine 219 progresses to block 333 in which the device determines whether or not it is the final destination of the data payload just received. If so, then the subroutine 219 progresses to block 336 in which the device transmits the current receive session identifier SX+1 and the transaction identifier TX to the service device 103 along with a destination indicator (end signal END). A destination indicator informs the service device 103 that the current device is the final destination of the data transmitted via the multi-hop network 100. Thereafter, the subroutine 219 ends and the report logic reverts back to block 203 as shown in FIG. 2A.

Figure 2D:
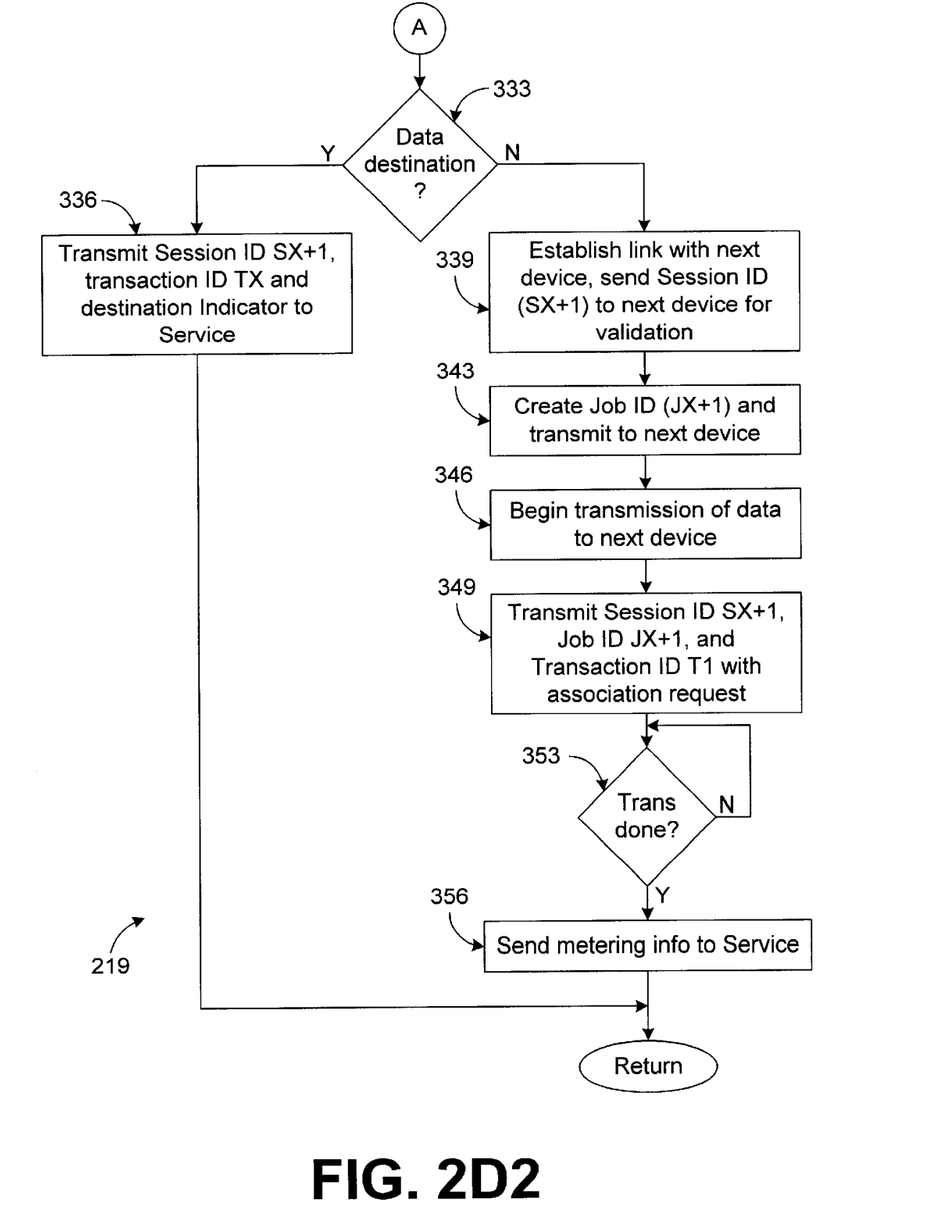

On the other hand, if in block 333 the current device is not the final destination of the data transmitted, then it must transmit the data in a segment transfer to the next device 109a, 109b, or 113 on route to its final destination thereby completing the data transfer transaction. The device to which the next segment transfer is directed is a function of addressing information stored the data payload as well as the data protocol employed. In such case, the subroutine 219 progresses to block 339 where a communications link is established with the next device. Thereafter, the session identifier SX+1 of the current device is transmitted to the next device for validation. The subroutine 219 moves to block 343 in which a job identifier JX+1 is created and then transmitted to the next device. Thereafter, in block 346 the current device begins transmission of the data payload to the next device 109a, 109b, or 113.

Once the transmission of the data payload has begun, in block 349 the current device then transmits the current device's session identifier SX+1 and the job identifier JX+1 along with the previously received transaction identifier T1 to the service device 103. Also transmitted is an association request that asks the service device 103 to associate the session identifier SX+1 and the job identifier JX+1 with the transaction identifier T1 by storing the same in the tracking table 146 (FIG. 1) associated therewith. The subroutine 219 moves on to block 353 in which it is determined whether the data transmission to the next device is complete. If not, then the subroutine 219 remains at block 353. Once the transmission of the data is complete in block 353, the subroutine 219 moves to block 356 in which metering information relative to the data transmitted to the next device is sent to the service device 103. Thereafter, the receive subroutine 219 ends, and the report logic 149 (FIG. 2A) moves to block 203 (FIG. 2A).

Figure 3:
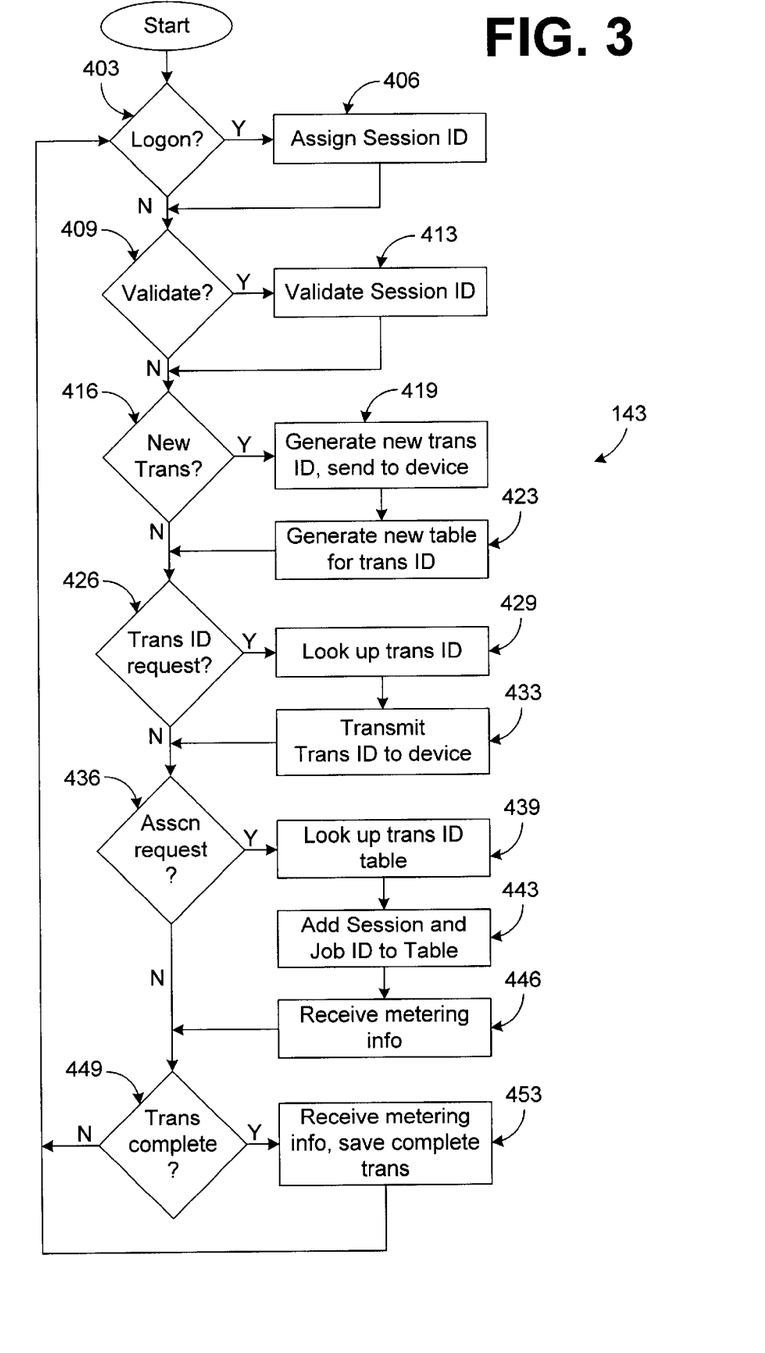
FIG. 3 is a flow chart of tracking logic executed in a service device of the multi-hop network of FIG. 1.

Turning now to FIG. 3, shown is a flow chart of the tracking logic 143 executed by the processor 116 of the service device 103. The tracking logic 143 essentially maintains the tracking table 146 (FIG. 1) by communicating with the devices 106, 109a, 109b, and 113 as discussed previously. Beginning then, with block 403, the service device 103 determines whether a particular device 106, 109a, 109b, or 113 is establishing data communications or logging on with the service device 103 for the first time. If so, then the tracking logic 143 progresses to block 406 in which the service device 103 assigns a session identifier SX to the particular device 106, 109a, 109b, or 113. From blocks 403 or 406, the tracking logic 143 progresses to block 409 in which the tracking logic 143 detects an attempt at validation by one of the devices 106, 109a, 109b, or 113. If a validation attempt is detected, then the tracking logic 143 progresses to block 413 in which the session identifier received from the particular device 106, 109a, 109b, or 113 is validated accordingly. If no validation attempt is detected in block 409, or once validation is successful in block 413, then the tracking logic 143 progresses to block 416. The validation involves confirming that the particular session identifier SX is assigned to a logged device 106, 109a, 109b, or 113.

In block 416, the service device 103 determines whether a new data transfer transaction is to be commenced as indicated by receiving a job identifier from a particular device 106, 109a, 109b, or 113 along with a request for a new globally unique transfer identifier TX. If so, then the tracking logic 143 progresses to block 419 in which a new globally unique transaction identifier is generated and sent to the particular device. Then, the tracking logic 143 moves to block 423 where a new tracking table 146 is generated and associated with the newly created transaction identifier TX.

If there is no transaction in block 416, or once the new tracking table 145 is generated in block 423, the tracking logic 143 moves to block 426 in which the tracking logic 143 determines whether an existing transaction identifier has been requested by a particular device 106, 109a, 109b, or 113.

If in block 426, a transaction identifier request has been received, the tracking logic 143 moves to block 149 in which the tracking logic 143 finds the particular tracking table 143 that holds the current session and job identifiers to identify the transaction identifier that is associated therewith. The tracking logic 143 then moves to block 433 in which the transaction identifier that is associated with the session and job identifiers is transmitted to the particular device as per the request. If no transaction identifier is requested in block 426, or once the transaction identifier has been transmitted to the requested device in block 433, the tracking logic 143 progresses to block 436.

In block 436, the service device 103 determines whether a particular device 106, 109a, 109b, or 113 has transmitted an association request that includes a session identifier, job identifier, and associated transaction identifier. If so, then the tracking logic 143 progresses to block 439 where the tracking logic 143 draws an association between the transaction identifier received and the transaction identifiers associated with the various tracking tables 146 stored in memory 123. Then, in block 443, the particular session and job identifiers are added to the associated tracking table 143. The tracking logic 143 then proceeds to block 446 in which metering information is received from the particular device 106, 109a, 109b, or 113. Or, on the other hand if in block 436, there is no association request, or the metering information has been received in block 446, then the tracking logic proceeds to block 449.

In block 449, the tracking logic 143 determines whether or not a destination indicator (END) has been received, as is the case in block 336 of subroutine 219 (FIG. 2D2). If the destination indicator is received indicating that the data transfer transaction is complete, then the tracking logic 143 progresses to block 453 in which metering information is received from the destination device 113 and all pertinent information relative to the transaction is saved for the various purposes of the service provider. Thereafter, the tracking logic 143 reverts back to block 403 to repeat the process once again. If in block 449, the data transfer transaction is not complete as there is no destination indicator received from the destination device 113, the tracking logic 143 also reverts back to block 403.

In addition to the foregoing discussion, the logic 143 and 149 of the present invention can be implemented in hardware, software, firmware, or a combination thereof. In the preferred embodiment(s), the logic 143 and 149 is implemented in software or firmware that is stored in a memory and that is executed by a suitable instruction execution system. If implemented in hardware, as in an alternative embodiment, the logic 143 and 149 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Also, the flow charts of FIGS. 2A, 2B, 2C, 2D1, 2D2, and 3 show the architecture, functionality, and operation of a possible implementation of the logic 143 and 149. In this regard, each block represents a module, segment, or portion of code, which comprises one or more executable instructions for implementing the specified logical function(s). It should also be noted that in some alternative implementations, the functions noted in the blocks may occur out of the order noted in FIGS. 2A, 2B, 2C, 2D1, 2D2, and 3. For example, two blocks shown in succession in FIGS. 2A, 2B, 2C, 2D1, 2D2, and 3 may in fact be executed substantially concurrently or the blocks may sometimes be executed in the reverse order, depending upon the functionality involved.

Finally, the logic 143 and 149, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A system for tracking a data transfer transaction across a multi-hop network, comprising:
   a plurality of devices that conduct a data transfer transaction having at least one segment transfer across the multi-hop network, the plurality of devices including an origination device and a destination device;
   a service device in communication with the plurality of devices, the service device generating a globally unique transaction identifier associated with the data transfer transaction;
   a tracking table maintained in the service device to track the data transfer transaction from the origination device to the destination device, the tracking table being associated with the globally unique transaction identifier;
   a session identifier associated with each of the plurality of devices; and
   a job identifier associated with the segment transfer, the job identifier being generated by the respective one of the plurality of devices that conducts the segment transfer.

2. A system for tracking a data transfer transaction across a multi-hop network, comprising:
   a plurality of devices that conduct a data transfer transaction having at least one segment transfer across the multi-hop network, the plurality of devices including an origination device and a destination device;
   a service device in communication with the plurality of devices, the service device generating a globally unique transaction identifier associated with the data transfer transaction;
   a tracking table maintained in the service device to track the data transfer transaction from the origination device to the destination device, the tracking table being associated with the globally unique transaction identifier;
   wherein the service device transmits the globally unique transaction identifier to a respective one of the plurality of devices upon receiving a job identifier generated by the respective one of the plurality of devices; and
   wherein the plurality of devices each transmit an associated session identifier, a new job identifier, and the globally unique transaction identifier to the service device upon conducting the segment transfer to facilitate tracking of the segment transfer by the service device.

3. The system of claim 2, wherein the service device tracks the data transfer transaction by drawing an association between a first transaction identifier received from the plurality of devices and a second transaction identifier associated with the tracking table, the service device storing the respective session identifier and the new job identifier in the tracking table.

4. A method for tracking a data transfer transaction across a multi-hop network, comprising the steps of:
   conducting a data transfer transaction among a plurality of devices in the multi-hop network, the data transfer transaction having at least one segment transfer across the multi-hop network, the plurality of devices including an origination device and a destination device;
   generating a globally unique transaction identifier associated with the data transfer transaction in a service device, the service device being in communication with the plurality of devices;
   maintaining a tracking table in the service device to track the data transfer transaction from the origination device to the destination device, the tracking table being associated with the globally unique transaction identifier;
   associating a session identifier with each of the plurality of devices; and
   associating a job identifier with the segment transfer, the job identifier being generated by the respective one of the plurality of devices that conducts the segment transfer.

5. A method for tracking a data transfer transaction across a multi-hop network, comprising the steps of:
   conducting a data transfer transaction among a plurality of devices in the multi-hop network, the data transfer transaction having at least one segment transfer across the multi-hop network, the plurality of devices including an origination device and a destination device;

generating a globally unique transaction identifier associated with the data transfer transaction in a service device, the service device being in communication with the plurality of devices;

maintaining a tracking table in the service device to track the data transfer transaction from the origination device to the destination device, the tracking table being associated with the globally unique transaction identifier;

transmitting the globally unique transaction identifier from the service device to a respective one of the plurality of devices upon receiving a job identifier generated by the respective one of the plurality of devices; and transmitting an associated session identifier, a new job identifier, and the globally unique transaction identifier from the plurality of devices to the service device upon conducting the segment transfer to facilitate tracking of the segment transfer by the service device.

6. The method of claim 5 further comprising the step of tracking the data transfer transaction in the service device by drawing an association between a first transaction identifier received from the plurality of devices and a second transaction identifier associated with the tracking table, the service device storing the respective session identifier and the new job identifier in the tracking table.

7. A system for tracking a data transfer transaction across a multi-hop network, comprising:

means for conducting a data transfer transaction among a plurality of devices in the multi-hop network, the data transfer transaction having at least one segment transfer across the multi-hop network, the plurality of devices including an origination device and a destination device;

means for generating a globally unique transaction identifier associated with the data transfer transaction in a service device, the service device being in communication with the plurality of devices;

means for maintaining a tracking table in the service device to track the data transfer transaction from the origination device to the destination device, the tracking table being associated with the globally unique transaction identifier;

means for associating a session identifier with each of the plurality of devices; and means for associating a job identifier with the segment transfer, the job identifier being generated by a respective one of the plurality of devices that conducts the segment transfer.

8. A system for tracking a data transfer transaction across a multi-hop network, comprising:

means for conducting a data transfer transaction among a plurality of devices in the multi-hop network, the data transfer transaction having at least one segment transfer across the multi-hop network, the plurality of devices including an origination device and a destination device;

means for generating a globally unique transaction identifier associated with the data transfer transaction in a service device, the service device being in communication with the plurality of devices;

means for maintaining a tracking table in the service device to track the data transfer transaction from the origination device to the destination device, the tracking table being associated with the globally unique transaction identifier;

means for transmitting the globally unique transaction identifier from the service device to a respective one of the plurality of devices upon receiving a job identifier generated by the respective one of the plurality of devices; and means for transmitting an associated session identifier, a new job identifier, and the globally unique transaction identifier from the plurality of devices to the service device upon conducting the segment transfer to facilitate tracking of the segment transfer by the service device.

9. The system of claim 8, further comprising means for tracking the data transfer transaction in the service device by drawing an association between a first transaction identifier received from the plurality of devices and a second transaction identifier associated with the tracking table, the service device storing the respective session identifier and the new job identifier in the tracking table.

* * * * *